US005730320A

United States Patent [19]

David

[11] Patent Number: 5,730,320

[45] Date of Patent: Mar. 24, 1998

[54] PRODUCT DISPENSING APPARATUS

[75] Inventor: Henry B. David, Glendale, Calif.

[73] Assignee: Melco Wire Products Co., Glendale, Calif.

[21] Appl. No.: 599,034

[22] Filed: Feb. 9, 1996

[51] Int. Cl.$^{6}$ .......... B65G 59/00

[52] U.S. Cl. .......... 221/279; 311/59.3

[58] Field of Search .......... 221/131, 92, 241, 221/242, 279, 268, 226; 211/59.3

[56] References Cited

U.S. PATENT DOCUMENTS 4,729,481 3/1988 Hawkinson et al. .......... 211/59.3

5,190,186 3/1993 Yablaws et al. .......... 221/279

*Primary Examiner*—Kenneth Noland

*Attorney, Agent, or Firm*—Michael A. Painter

[57] ABSTRACT

A dispensing apparatus for packaged products which includes a plurality of parallel channels, each of which independently positions products for dispensing. Each product dispensing channel is separated from the adjacent channel or channels by a removable divider wall and is adapted to support and dispense packaged products having a common configuration. The product packages aligned within a dispensing channel are supported upon a pair of parallel guide rails which extend from the rear to the forward position of the dispensing apparatus. A positioning member is disposed within each channel and is slidably engaged upon the parallel guide rail. The positioning member is biased toward the front dispenser support thereby positioning all product packages within a dispensing channel adjacent one another and forwardly toward the front dispenser support.

8 Claims, 2 Drawing Sheets

FIG. 4.
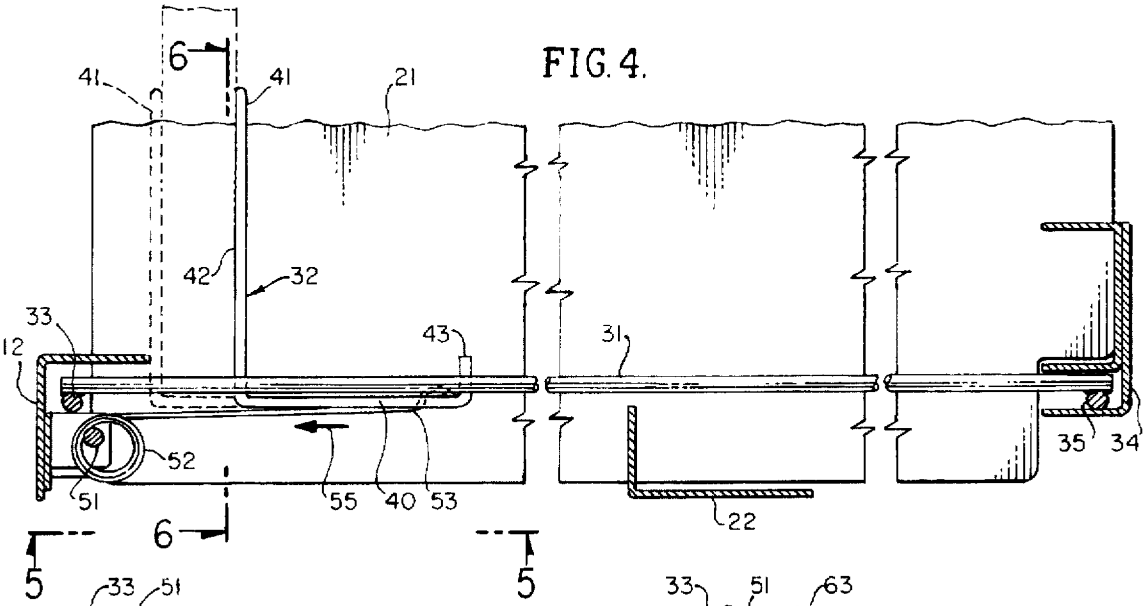
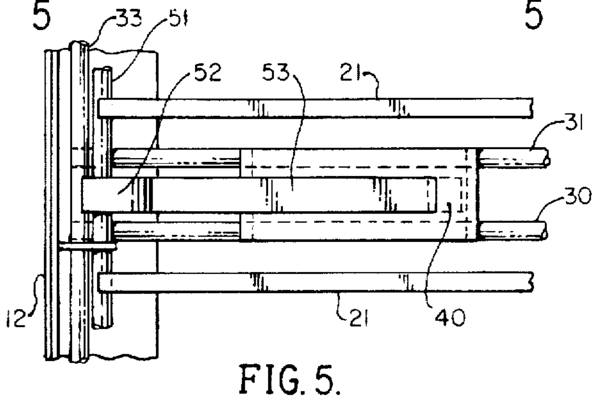
FIG. 5.
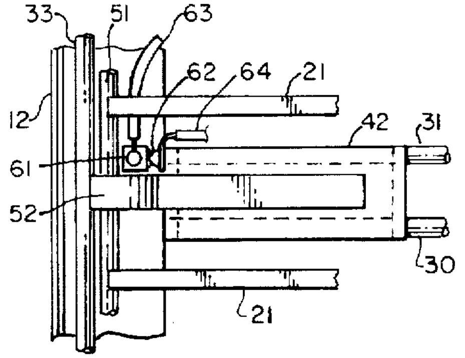
FIG. 8.
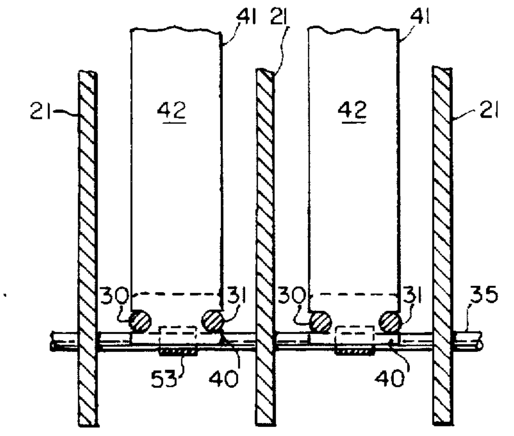
FIG. 6.
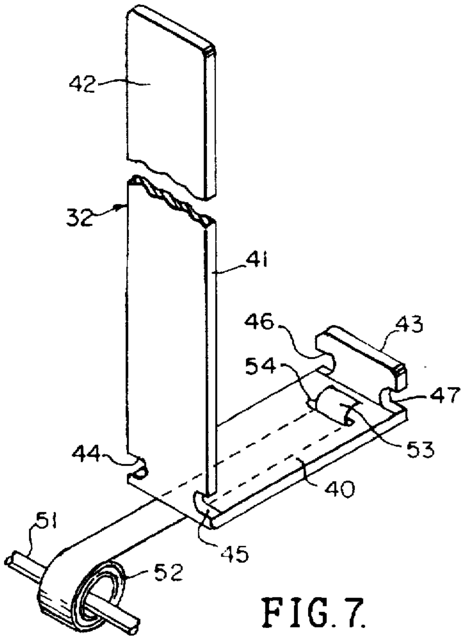
FIG. 7.

PRODUCT DISPENSING APPARATUS

BACKGROUND OF THE INVENTION

1. Field of the Invention

The present invention generally relates to store fixtures capable of storing, displaying and dispensing packaged products, and more particularly, to dispensing apparatus which positions packaging forwardly to the front of the dispenser.

2. Prior Art

The prior art discloses numerous apparatus which are intended to display and dispense packaged goods. In the typical device disclosed by the prior art, a plurality of parallel channels are adapted to store and display packaging. Typically, the packaged goods are delivered to the front of the shelf by inclining the support for the packages and utilizing gravity to urge the packages downwardly and forwardly toward the front of the apparatus. The problems existing in these devices are inherent in their construction. The designs exhibited by the prior art lack the degree of adjustability and flexibility to dispense packaging of different sizes and to insure the delivery of product packaging at the forward position of the channel. Even where biased pushers are used to urge the product packaging forwardly, the devices disclosed by the prior art fail to provide store fixture systems which maintain final product presentation and facilitates to aid removal and restocking of displayed products.

The present invention solves those problems inherent in the designs exhibited by the prior art. The present invention apparatus comprises a plurality of parallel product dispensing channels separated by removable divider walls. Each channel consists of a pair of guide rails in parallel spaced relation to each other and to the dispensing channel. The rails extend the length of the dispensing channel from the rearward support to the forward support of the apparatus. A positioning member is slidably engaged between the guide rails, a portion thereof extending vertically upwardly to thereby present a pushing surface which is adapted to be positioned adjacent the rearwardmost product package within the dispensing channel. A resilient member is coupled between the positioning member and the forward support of the apparatus to bias the positioning member toward the front of the dispensing apparatus. When all product packages within a dispensing channel have been removed, an out-of-stock signal is generated to provide notice that restocking is necessary.

SUMMARY OF THE INVENTION

The present invention comprises a product dispensing apparatus which maintains the presentation of packaged products and aids when restocking the products is necessary. The apparatus comprises a plurality of parallel product dispensing channels which extend from the rearward support of the apparatus to the front support. The width of each dispensing channel is equal, a removable divider wall being disposed between each pair of adjacent dispensing channels. A pair of guide rails in parallel spaced relation to each other are uniformly mounted within each dispensing channel from the rear to the front support. A positioning member is slidingly engaged to the guide rail within each dispensing channel. The positioning member includes a vertically extending pusher surface which is adapted to engage packaged products disposed within a dispensing channel. Product packaging having widths greater than a dispensing channel may be accommodated by the removal of one or more divider walls.

The positioning members are resiliently coupled to the front support of the apparatus through a biasing spring. All packaged products intermediate the pusher surface of a positioning member and the front support of the apparatus will be maintained in place forwardly toward the front support of the dispensing apparatus. When all packaged products have been removed from a dispensing channel, an out-of-stock signal is generated to give notice of the need to restock the dispensing channel.

It is therefore an object of the present invention to provide an improved product dispensing apparatus.

It is another object of the present invention to provide a dispensing apparatus of packaged products which will position the packages forwardly toward the front of the dispensing apparatus.

It is still another object of the present invention to provide a product dispensing apparatus which will provide a signal alerting to the for restocking a dispensing channel.

It is still yet another object of the present invention to provide a product dispensing apparatus which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

BRIEF DESCRIPTION OF THE DRAWING

FIG. 4 is a partial cross-sectional view of a dispensing channel taken through line 4—4 of FIG. 3.

FIG. 5 is a partial, bottom plan view of the dispensing channel taken at lines 5—5 of FIG. 4.

FIG. 6 is a partial, cross-sectional frontal view of adjacent dispensing channels taken through lines 6—6 of FIG. 4.

FIG. 7 is a perspective view of a positioning member and biasing spring in accordance with the present invention.

FIG. 8 is a partial bottom plan view of an alternative embodiment of the present invention incorporating an out of stock signal member.

DESCRIPTION OF THE PRESENTLY PREFERRED EMBODIMENT.

Figure 1:
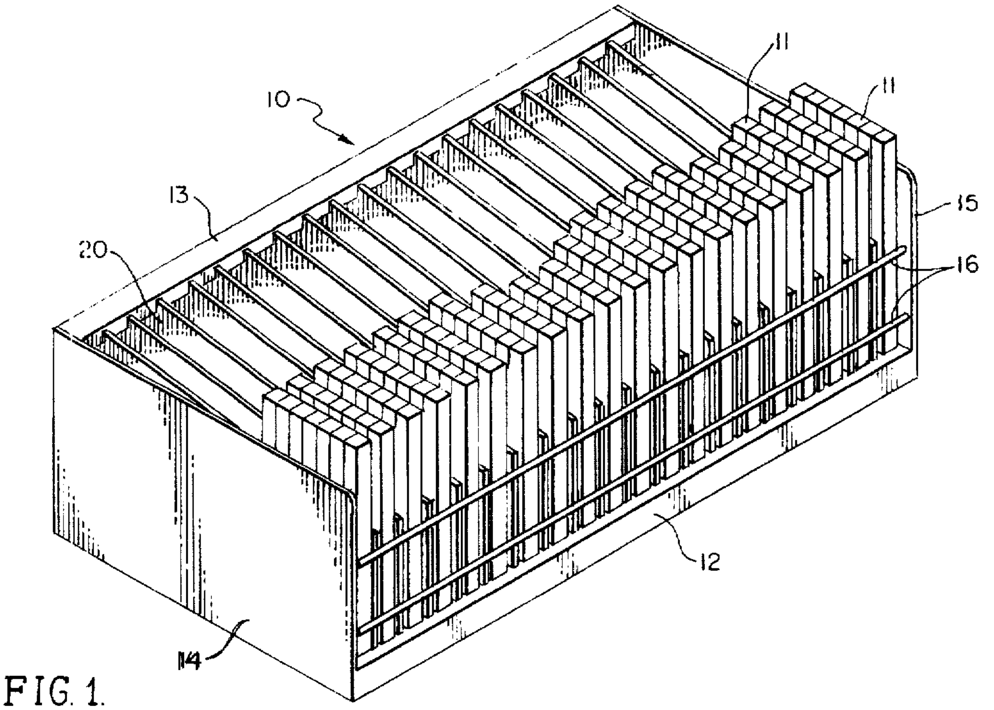
FIG. 1 is a perspective view of a product dispensing apparatus in accordance with the present invention.
Figure 2:
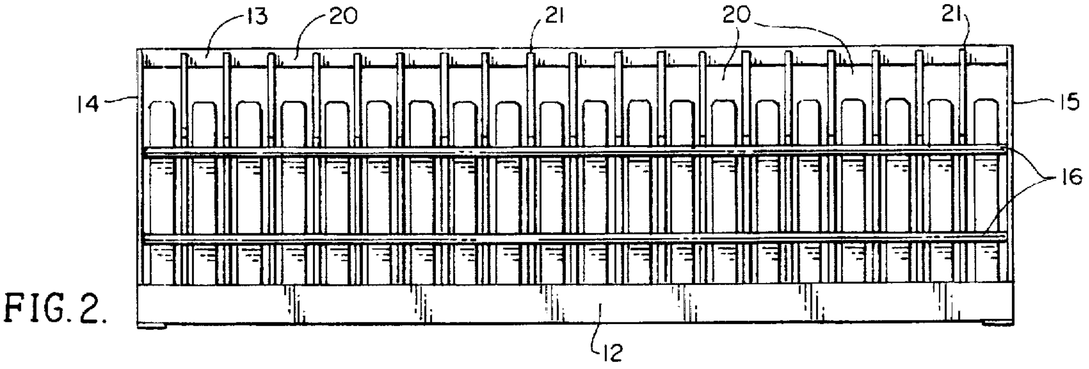
FIG. 2 is a front elevation view of the product dispensing apparatus shown in FIG. 1.
Figure 3:
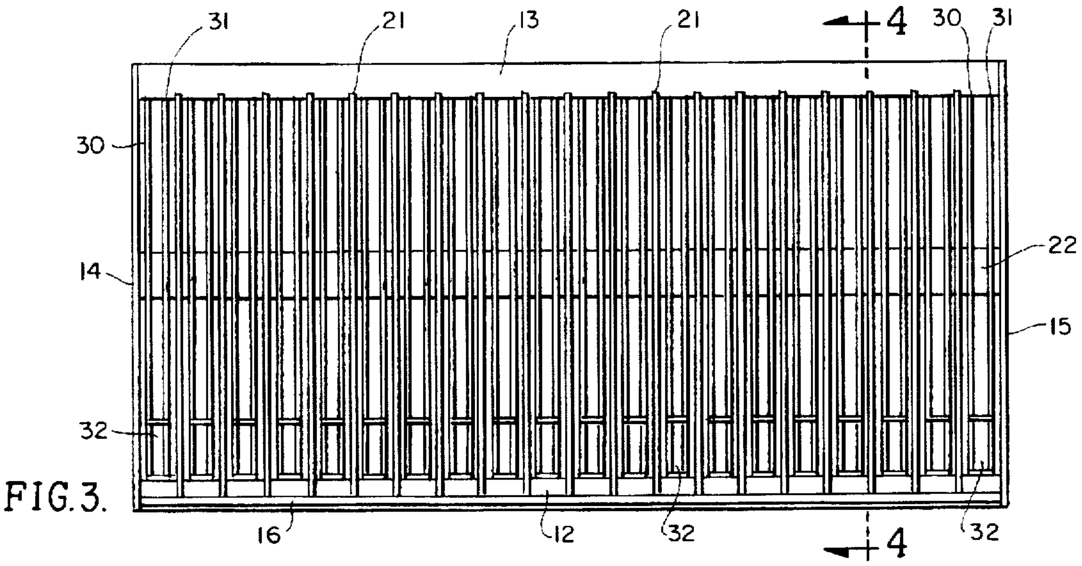
FIG. 3 is a top plan view of the present invention product dispensing apparatus.

An understanding of the present invention product dispensing apparatus 10 may be best gained by reference to FIGS. 1, 2 and 3. Product dispensing apparatus 10 is adapted to stock and dispense packaged products 11 typically designated by the reference numerals 11. It is understood the articles which may be dispensed from the present invention apparatus may include, for example, toothbrushes, cosmetic containers, individual packages of cigarettes and any other articles which are individually packaged.

The product dispensing apparatus may be seen to include a frontal support 12 and an upper rear support 13 laterally enclosed by a pair of side panels 14 and 15. A pair of front stop means 16 are secured between side panels 14 and 15. Front stop means 16 are adapted to prevent inadvertent dislodgment of packages 11 from dispensing apparatus 10.

As can be best seen in FIG. 2 and FIG. 3, the present invention dispensing apparatus 10 is divided into a plurality of parallel dispensing channels 20. Each dispensing channel 20 is separated from an adjacent channel or channels by a divider wall 21. Divider walls 21 are in parallel spaced relation to each other and to side panels 14 and 15. Divider walls 21 are removeably coupled between upper rear support 13 and frontal support 12 and are vertically maintained in position by resting upon bottom member 22. Each of the dispensing channels 20 are substantially uniform in width. By providing the removability of divider walls 21, product packaging of varying widths may be accommodated.

Product packages 11 disposed within a single dispensing channel 20 are supported by a pair of guide rails 30 and 31 which are in parallel spaced relation to each other and to divider walls 21 and side panels 14 and 15. As will be explained in detail hereinbelow, a positioning member 32 is slidably coupled upon each pair of guide rails 30 and 31 and biased toward frontal support 12.

The operation of the present invention product dispensing apparatus may be best gained by reference to FIGS. 4–7, inclusive. A partial cross-sectional view of a dispensing channel is shown in FIG. 4. Frontal support 12 incorporates a front guide shaft. In a similar manner, lower rear support 34 incorporates a rear guide shaft 35. Guide shafts 33 and 35 extend between side panels 14 and 15. As can be best seen in FIG. 4, guide rails 30 and 31 are secured between guide shafts 30 and 35 and are positioned perpendicular thereto.

As stated hereinabove, positioning member 32 slidably engages guide rails 30 and 31. The construction of positioning member 32 and its interface to guide rails 30 and 31 may be best seen by reference to FIGS. 6 and 7. Positioning member 32 consists of a substantially L-shaped flange having a horizontal base 40 and integrally extending upwardly from the forwardmost terminus thereof, a pusher 41. Pusher 41 incorporates a substantially vertical surface 42 which is adapted to be positioned adjacent one or more aligned packaged products 11 for the purpose of implementing the objectives of the present invention. Extending upwardly from base 40 in opposition to pusher 41 is guide flange 43. A pair of follower surfaces 44 and 45 are formed in the lowermost portion of pusher 41 adjacent base 40. In a like manner, a pair of follower surfaces 46 and 47 are disposed in the lowermost portion of guide flange 43 adjacent space 40. Follower surfaces 44 and 46 are adapted to receive guide rail 30; follower surfaces 45 and 47 are adapted to receive guide rail 31. When installed, a positioning member 32 will slidably engage guide rails 30 and 31 and be horizontally moveable thereon from lower rear support 34 to frontal support 12.

In order to implement an objective of the present invention, each of the positioning members 32 is biased toward frontal support 12. As can be seen in FIG. 4, biasing shaft 51 is longitudinally secured along frontal support 12 in parallel spaced relation to front guide shaft 33. Biasing shaft 51 extends along frontal support 12 between side panels 14 and 15. The preferred embodiment of the present invention employs a coiled biasing spring 52. Biasing shaft 51 is disposed along the cylindrical axis of each coiled spring 52. The terminus 53 of coil spring 52 is extended from biasing shaft 51 and inserted through an aperture 54 in base 40 of positioning member 32. As shown in FIG. 4, the extension of coil spring 52 will bias positioning member 32 to be urged in the direction identified by reference numeral 55. Although a coiled biasing spring 52 is employed in the preferred embodiment of the present invention, it is understood that other conventional resilient means could be employed to bias positioning member 32 toward frontal support 12.

As shown in FIG. 1, a dispensing channel 20 defined by a pair of divider walls 21 is adapted to stock and display a plurality of aligned product packages 11. Since divider walls 21 are removable, it is understood the present invention may accommodate and dispense product packages having widths greater than a single dispensing channel 20. In use, a plurality of aligned packages 11 are disposed within a dispensing channel 20 between pusher 41 and frontal support 12. The packages will be urged forwardly against frontal support 12 in response to the resilient force imposed on positioning member 32 by biasing spring 52. It can therefore be seen the present invention maintains the presentation of the product packages 11 by urging the packages 11 forwardly in a manner which facilitates consumer access to the products.

As stated hereinabove, it is an objective of the present invention to provide means for alerting the user to an out-of-stock condition. FIG. 8 illustrates the orientation of positioning member 32 after all product packages 11 within the respective dispensing channel 20 have been exhausted. When all product packages 11 within a dispensing channel 20 have been dispensed, pusher surface 42 will be adjacent frontal support 12. When this condition occurs, the present invention provides means for communicating indicia responsive to the out-of-stock condition.

In a preferred form of the embodiment illustrated by FIG. 8, the out-of-stock condition is detected by the engagement of a pair of electrical contacts 61 and 62. Electrical contact 62 is secured to the lowermost portion of surface 42. Electrical contact 61 is secured to frontal support 12 and positioned in a manner that it will be adjacent contact 61 when pusher 41 is adjacent frontal support 12 as shown in phantom lines in FIG. 4. Leads 63 and 64 are connected to contact 61 and 62, respectively. In an out-of-stock position, electrical contacts 61 and 62 will be in the position shown in FIG. 8. Leads 63 and 64 are connected to a signal generator (not shown) which will provide notice of the out-of-stock condition. It is understood that conventional signaling indicia achieved through detection of electrical continuity, i.e., zero resistance, or predetermined voltage or current levels may be applied to leads 63 and 64 to alert the user to the status of positioning member 42 as shown in FIG. 8 and thereby give notice of an out-of-stock position.

It can therefore be seen the present invention product dispensing apparatus provides means for displaying packaged merchandise in an orderly manner facilitates dispensing packaged products of different sizes. Furthermore, the present invention maintains the position of the packaged products in the forward-most position thereby enhancing the public's access to the products being dispensed. Lastly, the present invention provides means for alerting the user of the present invention to out-of-stock conditions.

I claim:

1. A dispensing apparatus for packaged articles comprising:

(a) an elongated frontal support having a plurality of receiving slots disposed therein, said elongated frontal support including a biasing shaft perpendicular to and spaced from said guide rails;

(b) an elongated rear support in parallel spaced relation to said frontal support and having a plurality of receiving slots disposed therein in alignment with the receiving slots in said frontal support;

(c) a plurality of divider walls disposed between said frontal support and rear support, each removeably mounted within aligned receiving slots in said frontal support and rear support;

(d) first and second guide rails extending from said elongated rear support to said elongated frontal support adjacent one or more of said divider walls, said first and second guide rails being in parallel spaced relation to each other and to said divider walls;

(e) positioning means slidably engaged upon said guide rails for positioning the packaged articles adjacent the frontal support, said positioning means comprising a base member having a forward and rearward edge, a pusher extending upwardly from said forward edge, a guide flange extending upwardly from said rearward edge and follower means disposed in said pusher and said guide flange slidably coupling said positioning means to said guide rails; and (f) biasing means secured between said elongated frontal support and said positioning means for biasing the position of the packaged articles forwardly toward the frontal support.

2. A dispensing apparatus as defined in claim 1 wherein said biasing means is coupled to said base member.

3. A dispensing apparatus as defined in claim 1 wherein said biasing means comprises a coiled spring annularly disposed about said biasing shaft.

4. A dispensing apparatus for packaged articles comprising:

(a) an elongated frontal support;

(b) an elongated rear support in parallel spaced relation to said elongated frontal support including a biasing shaft perpendicular to and spaced from said guide rails;

(c) a plurality of article dispensing channels in parallel spaced relation to each other and disposed between and perpendicular to said elongated frontal support and elongated rear support, each of said article dispensing channels comprising:

(i) first and second guide rails extending from said elongated rear support to said elongated frontal support and being in parallel spaced relation to each other;

(ii) positioning means slidably engaged upon said guide rails for positioning the packaged articles adjacent the frontal support; and (iii) biasing means secured between said elongated frontal support and said positioning means for biasing the position of the packaged articles forwardly toward the frontal support.

5. A dispensing apparatus as defined in claim 1 wherein said biasing means is coupled to said base member.

6. A dispensing apparatus as defined in claim 1 wherein said biasing means includes a coiled spring annularly disposed about said biasing shaft.

7. A dispensing apparatus for packaged articles comprising:

(a) an elongated frontal support including a biasing shaft;

(b) an elongated rear support in parallel spaced relation to said frontal support;

(c) a plurality of article dispensing channels in parallel spaced relation to each other and disposed between and perpendicular to said elongated frontal support and elongated rear support, each article dispensing channel being separated from an adjacent article dispensing channel by a divider wall removeably coupled intermediate said elongated frontal support and elongated rear support, each of said article dispensing channels comprising:

(i) first and second guide rails extending from said elongated rear support to said elongated frontal support, said first and second guide rails being in parallel spaced relation to each other and to said divider walls;

(ii) a positioning member consisting of a base member having a forward and rearward edge, a pusher extending upwardly from said forward edge, a guide flange extending upwardly from said rearward edge and following means disposed in said pusher and said guide flange for slidably coupling said positioning member to said guide rails;

(iii) a coiled spring having a coiled portion and an extended end, said coiled portion being angularly disposed about said biasing shaft, said extended end being coupled to said base member.

8. A dispensing apparatus as defined in claim 7 further including out-of-stock detection means coupled intermediate the pusher of each of said positioning members and said elongated frontal support for identifying an out-of-stock condition in each of said article dispensing channels.

* * * * *